United States Patent
Li et al.

(10) Patent No.: US 11,036,957 B2
(45) Date of Patent: Jun. 15, 2021

(54) FINGERPRINT IMAGE PROCESSING METHOD, OPTICAL FINGERPRINT IDENTIFICATION SYSTEM AND ELECTRONIC DEVICE

(71) Applicant: Shenzhen Goodix Technology Co., Ltd., Guangdong (CN)

(72) Inventors: Chung-Te Li, Taipei (TW); Chieh-Wei Lo, Taipei (TW)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 239 days.

(21) Appl. No.: 16/044,490

(22) Filed: Jul. 24, 2018

(65) Prior Publication Data

US 2018/0365470 A1   Dec. 20, 2018

Related U.S. Application Data

(63) Continuation of application No. PCT/CN2017/088540, filed on Jun. 16, 2017.

(51) Int. Cl.
*G06K 9/00* (2006.01)
*G06K 9/62* (2006.01)
*G06T 5/50* (2006.01)

(52) U.S. Cl.
CPC ....... *G06K 9/0004* (2013.01); *G06K 9/00067* (2013.01); *G06K 9/6202* (2013.01); *G06T 5/50* (2013.01); *G06T 2207/20024* (2013.01); *G06T 2207/20056* (2013.01); *G06T 2207/20216* (2013.01); *G06T 2207/20224* (2013.01)

(58) Field of Classification Search
None
See application file for complete search history.

(56) References Cited

U.S. PATENT DOCUMENTS

| 6,535,622 | B1 * | 3/2003 | Russo | G06K 9/00013 340/5.83 |
| 7,855,718 | B2 | 12/2010 | Westerman | |
| 2007/0152984 | A1 * | 7/2007 | Ording | G06F 3/04845 345/173 |

(Continued)

FOREIGN PATENT DOCUMENTS

| CN | 102981667 A | 3/2013 |
| CN | 105205442 A | 12/2015 |

(Continued)

*Primary Examiner* — Bernard Krasnic
(74) *Attorney, Agent, or Firm* — Winston Hsu

(57) ABSTRACT

The present application provides a fingerprint image processing method, applied in an optical fingerprint identification system of an electronic device. The electronic device comprises a display pixel array. The optical fingerprint identification system comprises an image sensing array. The image sensing array is disposed under the display pixel array. The fingerprint image processing method comprises obtaining a background image and obtaining at least an interfering frequency when the display panel is not pressed by a finger of a user; receiving a received image when the display panel is pressed by the finger of the user; performing a subtracting operation on the received image and the background image to obtain a difference image; and performing a filtering operation on the difference image at the at least an interfering frequency to obtain an operational result.

12 Claims, 3 Drawing Sheets

(56) References Cited

U.S. PATENT DOCUMENTS

| | | |
|---|---|---|
| 2008/0122803 A1 | 5/2008 | Izadi |
| 2008/0158145 A1 | 7/2008 | Westerman |
| 2014/0168162 A1* | 6/2014 | Liao .................... G06F 3/0418 345/175 |
| 2015/0178934 A1* | 6/2015 | Yokono ................ G06K 9/4614 382/103 |
| 2016/0247010 A1 | 8/2016 | Huang |
| 2017/0220838 A1* | 8/2017 | He ....................... G06F 3/0412 |

FOREIGN PATENT DOCUMENTS

| | | |
|---|---|---|
| CN | 105721741 A | 6/2016 |
| CN | 106485237 A | 3/2017 |
| CN | 106709430 A | 5/2017 |
| CN | 106803053 A | 6/2017 |
| WO | 2016/205832 A1 | 12/2016 |

\* cited by examiner

FINGERPRINT IMAGE PROCESSING METHOD, OPTICAL FINGERPRINT IDENTIFICATION SYSTEM AND ELECTRONIC DEVICE

CROSS REFERENCE TO RELATED APPLICATIONS

The present application is a continuation of international application No. PCT/CN2017/088540, filed on Jun. 16, 2017, of which is incorporated herein by reference in its entirety.

FIELD OF THE INVENTION

The present application relates to a technical field of optical fingerprint identification, and more particularly, to a fingerprint image processing method, an optical fingerprint identification system and an electronic device enhancing fingerprint identification accuracy.

BACKGROUND

With the development of technology, mobile phones, digital cameras, tablet PCs, notebook computers and other portable electronic devices become more and more popular. The portable electronic devices are intended for personal use, with certain privacy. The information stored in the portable device such as phonebook, photos, personal information, etc., are privately owned. If the electronic device is lost, these data may be accessed by other people, causing unnecessary loss. Even though there are several ways using password to protect the electronic device from being used by the other people, the password may be easily to be spread or cracked, which lowers the security. Moreover, the user needs to remember the password so as to use electronic devices. If the user forgets the password, troubles would be brought to the user. Hence, personal fingerprint identification is utilized to achieve the purpose of personal identification, for enhancing the data security.

In another perspective, as the technology of fingerprint identification grows, the fingerprint identification system may be disposed under the display panel. That is, the use may press the display panel and the fingerprint identification may be performed. Specifically, the image sensing array of the fingerprint identification system may be disposed under the display pixel array of the display panel. However, for the optical fingerprint identification system, the image received by the image sensing array is easily affected by the display pixel array, such that the fingerprint is not accurately identified. Therefore, it is necessary to improve the prior art.

SUMMARY

It is therefore a primary objective of the present application to provide a fingerprint image processing method, an optical fingerprint identification system and an electronic device enhancing fingerprint identification accuracy, to improve over disadvantages of the prior art.

To solve the problem stated in the above, the present application provides a fingerprint image processing method, applied in an optical fingerprint identification system of an electronic device, wherein the electronic device comprises a display panel, the display panel comprises a display pixel array, the optical fingerprint identification system comprises an image sensing array, the image sensing array is disposed under the display pixel array, the fingerprint image processing method obtaining a background image and obtaining at least an interfering frequency when the display panel is not pressed by a finger of a user, wherein no fingerprint image is included in the background image; receiving a received image when the display panel is pressed by the finger of the user; performing a subtracting operation on the received image and the background image, to obtain a difference image; and performing a filtering operation on the difference image at the at least an interfering frequency, to obtain an operational result; wherein the optical fingerprint identification system determines a fingerprint within the received image according to the operational result.

Preferably, the step of the background image comprises: obtaining a plurality of first images, wherein no fingerprint image is included in the plurality of first images; and performing an average operation on the plurality of first images, to obtain a first background image corresponding to the plurality of first images.

Preferably, the step of obtaining the at least an interfering frequency comprises: obtaining a second background image, wherein no fingerprint image is included in the second background image; performing a subtracting operation and a transforming operation on the first background image and the second background image, to obtain a difference image spectrum; and performing an energy detection operation on the difference image spectrum, to obtain the at least an interfering frequency.

Preferably, the step of obtaining the at least an interfering frequency comprises: obtaining a plurality of second images, wherein no fingerprint image is included in the plurality of second images; and performing an average operation on the plurality of second images, to obtain the second background image.

The present application further provides an optical fingerprint identification system, applied in an electronic device. The electronic device comprises a display panel, the display panel comprises a display pixel array, the optical fingerprint identification system comprises an image sensing array, disposed under the display pixel array, configured to receive a received image when the display panel is pressed by a finger of a user; a computing module, coupled to the image sensing array, configured to execute following steps: obtaining a background image and obtaining at least an interfering frequency when the display panel is not pressed by the finger of the user, wherein no fingerprint image is included in the background image; performing a subtracting operation on the received image and the background image, to obtain a difference image; and performing a filtering operation on the difference image at the at least an interfering frequency, to obtain an operational result; and an identification module, coupled to the computing module, configured to determine a fingerprint within the received image according to the operational result.

The present application further provides an electronic device, comprises a display panel, comprises a display pixel array; and an optical fingerprint identification system, comprises an image sensing array, disposed under the display pixel array, configured to receive a received image when the display panel is pressed by a finger of a user; a computing module, coupled to the image sensing array, configured to execute following steps: obtaining a background image and obtaining at least an interfering frequency when the display panel is not pressed by the finger of the user, wherein no fingerprint image is included in the background image; performing a subtracting operation on the received image and the background image, to obtain a difference image; and performing a filtering operation on the difference image at the at least an interfering frequency, to obtain an operational result; and an identification module, coupled to the computing module, configured to determine a fingerprint within the received image according to the operational result.

The present application is suitable for in-display fingerprint identification, which utilizes subtracting the background image to eliminate the lattice interference, and utilizes filtering at the interfering frequencies to filter out the interference components to filter out the interference components. The fingerprint image is clearer. The present application has advantages of enhancing the accuracy of fingerprint identification.

DETAILED DESCRIPTION

In order to make the objects, technical solutions and advantages of the present application become more apparent, the following relies on the accompanying drawings and embodiments to describe the present application in further detail. It should be understood that the specific embodiments described herein are only for explaining the present application and are not intended to limit the present application.

Figure 1:
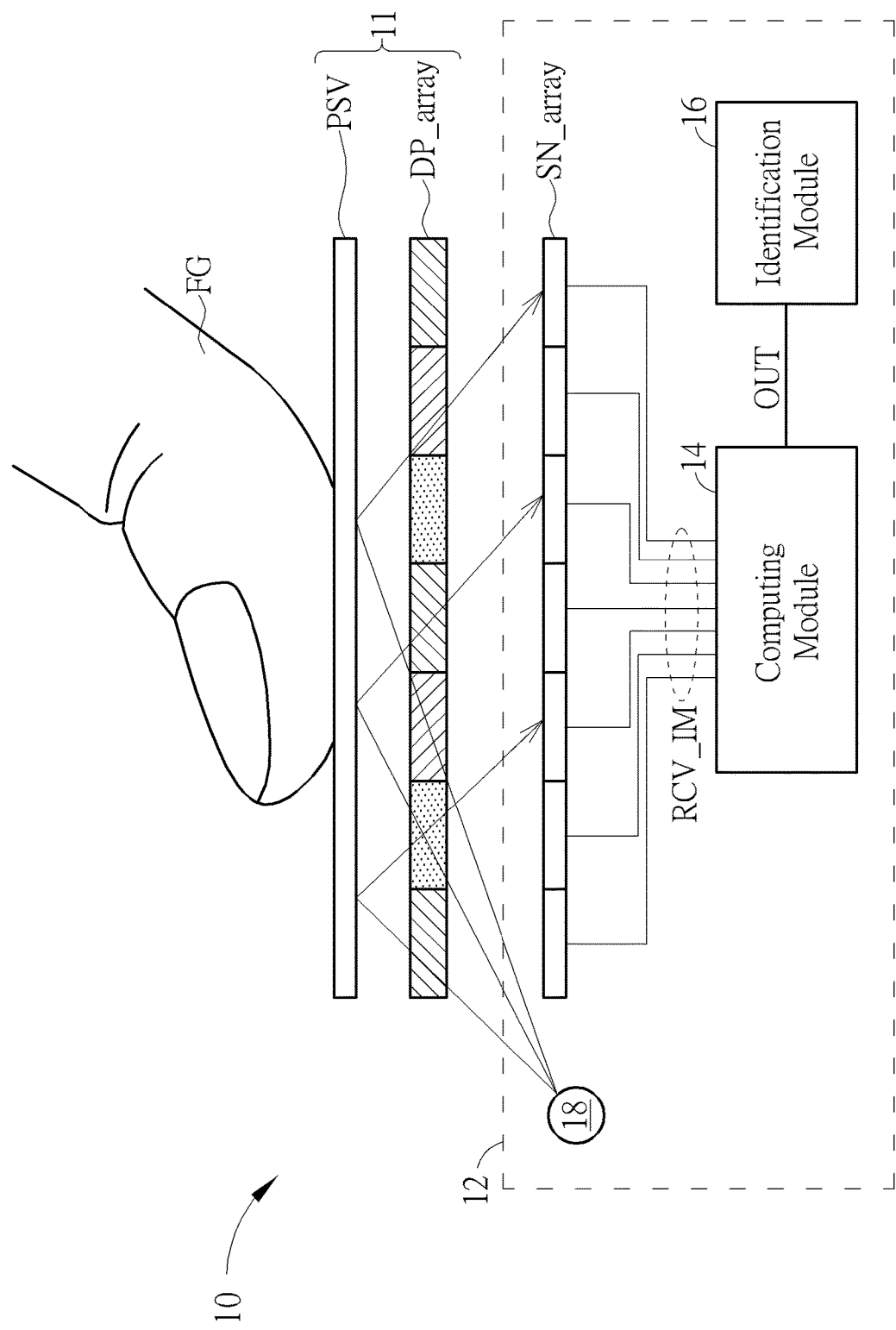
FIG. 1 is a schematic diagram of an electronic device according to an embodiment of the present application.

Please refer to FIG. 1. FIG. 1 is a schematic diagram of an electronic device 10 according to an embodiment of the present application. The electronic device 10 may be an electronic device such as a smart phone or a tablet computer including a display panel. The electronic device 10 comprises a display panel 11 and an optical fingerprint identification system 12. The display panel 11 comprises a display pixel array DP_array and a passivation layer PSV. The passivation layer PSV may be sapphire or a glass cover. The display pixel array DP_array may comprise a plurality of displaying pixel units. The plurality of displaying pixel units is arranged as an array, which may comprise a plurality of red light emitting elements, blue light emitting elements and green light emitting elements. The display pixel array DP_array of the display panel 11 is configured to display pictures which the electronic device 10 is expected to display.

The optical fingerprint identification system 12 is a fingerprint identification system disposed under the display panel 11 or the display pixel array DP_array, i.e. an In-Display fingerprint identification system. The optical fingerprint identification system 12 comprises an image sensing array SN_array, a computing module 14, an identification module 16 and a light emitting unit 18. The image sensing array SN_array comprises a plurality of image sensing pixel units arranged as an array.

When the optical fingerprint identification system 12 tends to identify a finger FG, the light emitting unit 18 emits an incident light toward the finger FG. The incident light would be reflected from the finger FG, and the reflected light would be received by the image sensing array SN_array.

That is, the image sensing array SN_array receives a received image RCV_IM according to the reflected light. After the image sensing array SN_array receives the received image RCV_IM, the received image RCV_IM is outputted to the computing module 14. The computing module 14 may perform a fingerprint image processing operation on the received image RCV_IM, and outputs the operational result of the fingerprint image processing operation to the identification module 16, and thus the identification module 16 may determine a fingerprint of the finger FG according to the operational result of the fingerprint image processing operation.

Notably, an area/size of the display pixel array DP_array is not necessarily (usually not) the same as an area/size of the displaying pixel units. In addition, the display pixel array DP_array is not necessarily (usually not) aligned with the image sensing array SN_array, such that the image RCV_IM received by the image sensing array SN_array is easily affected by the display pixel array DP_array, and the identification of the fingerprint of the finger FG is not accurate.

Figure 2:
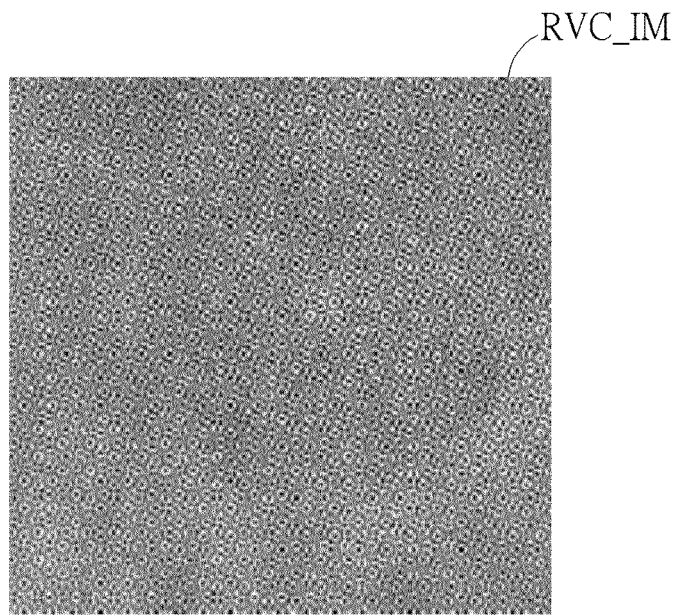
FIG. 2 is a schematic diagram of a received image according to an embodiment of the present application.

For example, please refer to FIG. 2, FIG. 2 is a schematic diagram of the received image RCV_IM received by the image sensing array SN_array, which is disposed under the display pixel array DP_array. Since it is affected by the display pixel array DP_array, there are multiple dark points and bright points within the received image RCV_IM, such that it is not easy for the identification module 16 to accurately identify the fingerprint of the finger FG according to the image RCV_IM.

Figure 3:
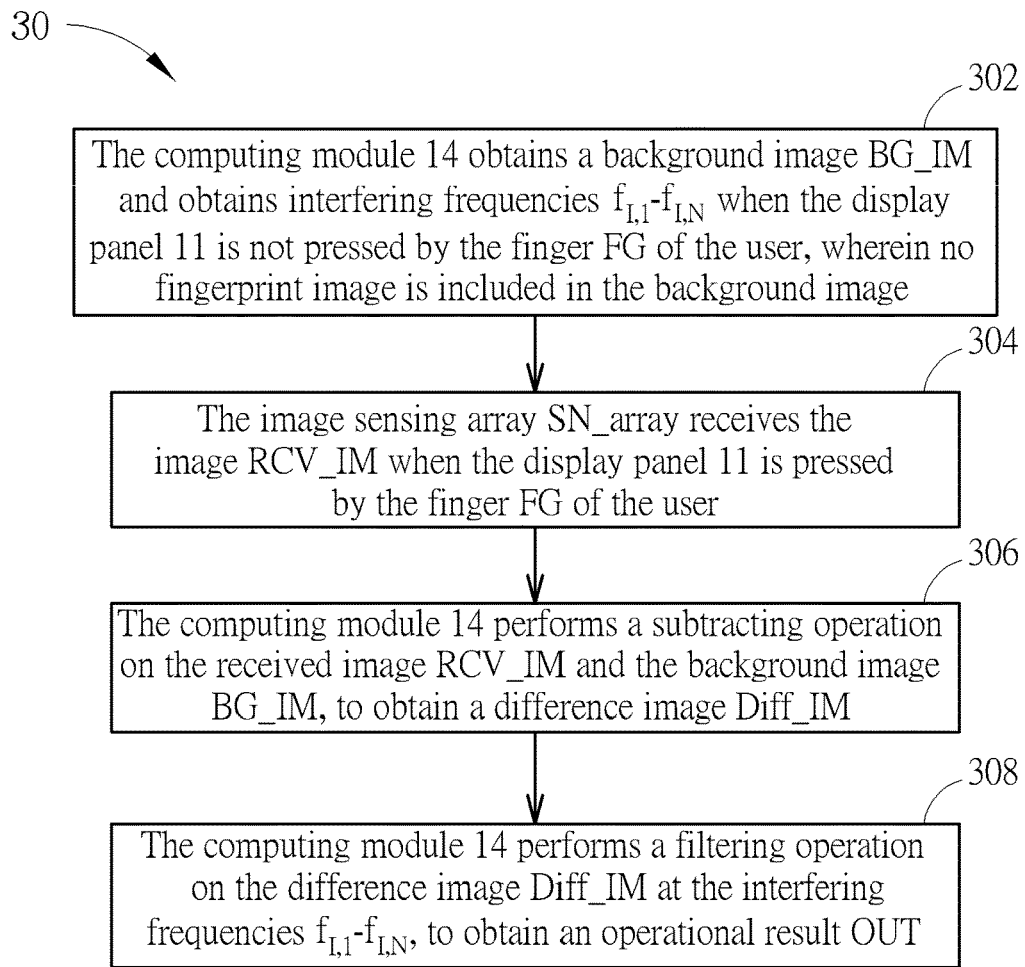
FIG. 3 is a schematic diagram of a fingerprint image processing process according to an embodiment of the present application.

Therefore, in order to exclude the affection of the display pixel array DP_array on the image RCV_IM, the computing module 14 may perform the fingerprint image processing operation on the received image RCV_IM. Please refer to FIG. 3, which is a schematic diagram of a fingerprint image processing process 30 according to an embodiment of the present application. The fingerprint image processing process 30 is executed by the optical fingerprint identification system 12, which comprises the following steps:

Step 302: The computing module 14 obtains a background image BG_IM and obtains interfering frequencies $f_{I,1}$-$f_{I,N}$ when the display panel 11 is not pressed by the finger FG of the user, wherein no fingerprint image is included in the background image.

Step 304: The image sensing array SN_array receives the image RCV_IM when the display panel 11 is pressed by the finger FG of the user.

Step 306: The computing module 14 performs a subtracting operation on the received image RCV_IM and the background image BG_IM, to obtain a difference image Diff_IM.

Step 308: The computing module 14 performs a filtering operation on the difference image Diff_IM at the interfering frequencies $f_{I,1}$-$f_{I,N}$, to obtain an operational result OUT.

Specifically, in Step 302, when the display panel 11 is not pressed by the finger FG of the user, the computing module 14 obtains the background image BG_IM and the interfering frequencies $f_{I,1}$-$f_{I,N}$. In detail, when the user does not press the finger on the display panel 11, the computing module 14 may obtain a plurality of first images IM_1 at a first time, and perform an average operation on the plurality of first images IM_1, so as to obtain a first background image BG_IM_1 corresponding to the plurality of first images IM_1. Moreover, the first background image BG_IM_1 comprises no fingerprint image, but comprises the dark points or the bright points (hereinafter, "lattice interference"), which are caused by different sizes of the displaying pixel units (within the display pixel array DP_array) and the image sensing pixel units (within the image sensing array SN_array), or caused by non-alignment between the display pixel array DP_array and the image sensing array SN_array. In addition, the computing module 14 may further obtain a plurality of second images IM_2 at a second time, and perform an average operation on the plurality of second images IM_2, so as to obtain a second background image BG_IM_2 corresponding to the plurality of second images IM_2. Similarly, the second background image BG_IM_2 comprises no fingerprint image but comprises the lattice interference. In addition, the background image BG_IM in Step 302 may be referred to the first background image BG_IM_1 or the second background image BG_IM_2.

Since the sizes/areas of the displaying pixel units and the image sensing pixel units and the arrangement of the display pixel array DP_array and the image sensing array SN_array (or an angle between the display pixel array DP_array and the image sensing array SN_array) are time-invariant, the lattice interference within the first background image BG_IM_1 and the lattice interference within the second background image BG_IM_2 should be the same. The computing module 14 may perform a subtracting operation and a transforming operation on the first background image BG_IM_1 and the second background image BG_IM_2, to obtain a difference image spectrum Diff_IM_SPM. Specifically, the computing module 14 may perform the subtracting operation on the first background image BG_IM_1 and the second background image BG_IM_2 first and then perform the transforming operation on the subtraction result of the first background image BG_IM_1 and the second background image BG_IM_2. Alternatively, the computing module 14 may perform the transforming operation on the first background image BG_IM_1 and the second background image BG_IM_2 first and then perform subtraction on the spectrum of the first background image BG_IM_1 and the spectrum of the second background image BG_IM_2, which are all within the scope of the present application. In an embodiment, the transforming operation may be a fast Fourier transform (FFT).

Whether the subtracting operation is performed before the transforming operation is performed or the transforming operation is performed before the subtracting operation is performed, the lattice interference within the first background image BG_IM_1 and the second background image BG_IM_2 would be eliminated when the subtracting operation is executed. In other words, none of the lattice interference is included in the difference image spectrum Diff_IM_SPM. In addition, material of the display pixel array DP_array and material of the image sensing array SN_array might have different expansion coefficients. When the ambient temperature of the electronic device 10 varies with time, the size or relative position of the display pixel array DP_array and the image sensing array SN_array at the first time and the second time may vary, an cause interference on the image received by the image sensing array SN_array, where the ambient temperature of the electronic device 10 at the first time is different from the ambient temperature at the second time.

In addition, the computing module 14 may perform an energy detection operation to derive frequency point which is easily to be interfered, called as the interfering frequency. Method of the computing module 14 performing the energy detection operation to obtain the interfering frequencies $f_{I,1}$-$f_{I,N}$ is not limited. For example, the computing module 14 may select frequency points with spectrum energy are greater than a specific value, according to the difference image spectrum Diff_IM_SPM, as the interfering frequencies $f_{I,1}$-$f_{I,N}$. Alternatively, the computing module 14 may perform statistical analysis on energy of each frequency point of the difference image spectrum Diff_IM_SPM, and select the first α% frequency points, in terms of spectrum energy, as the interfering frequencies $f_{I,1}$-$f_{I,N}$. The percentage α% may be modified according to practical situation, and may be 1%, 3% or 5%, and not limited thereto. For example, the percentage α% may be related to a statistical average μ plus several standard deviations σ, wherein the statistical average μ and the standard deviation σ are related to a statistical average and a standard deviation of spectrum energy on each frequency point of the difference image spectrum Diff_IM_SPM, respectively. In an embodiment, an energy distribution at a frequency point of the difference image spectrum Diff_IM_SPM may be assumed as a normal distribution. In other words, compared to other frequency points, the difference image spectrum Diff_IM_SPM has more energy at the interfering frequencies $f_{I,1}$-$f_{I,N}$. In addition, the computing module 14 is not limited to selecting multiple interfering frequencies $f_{I,1}$-$f_{I,N}$. The computing module 14 may simply select one single interfering frequency $f_I$ according to the difference image spectrum Diff_IM_SPM, which is also within the scope of the present application.

Figure 4:
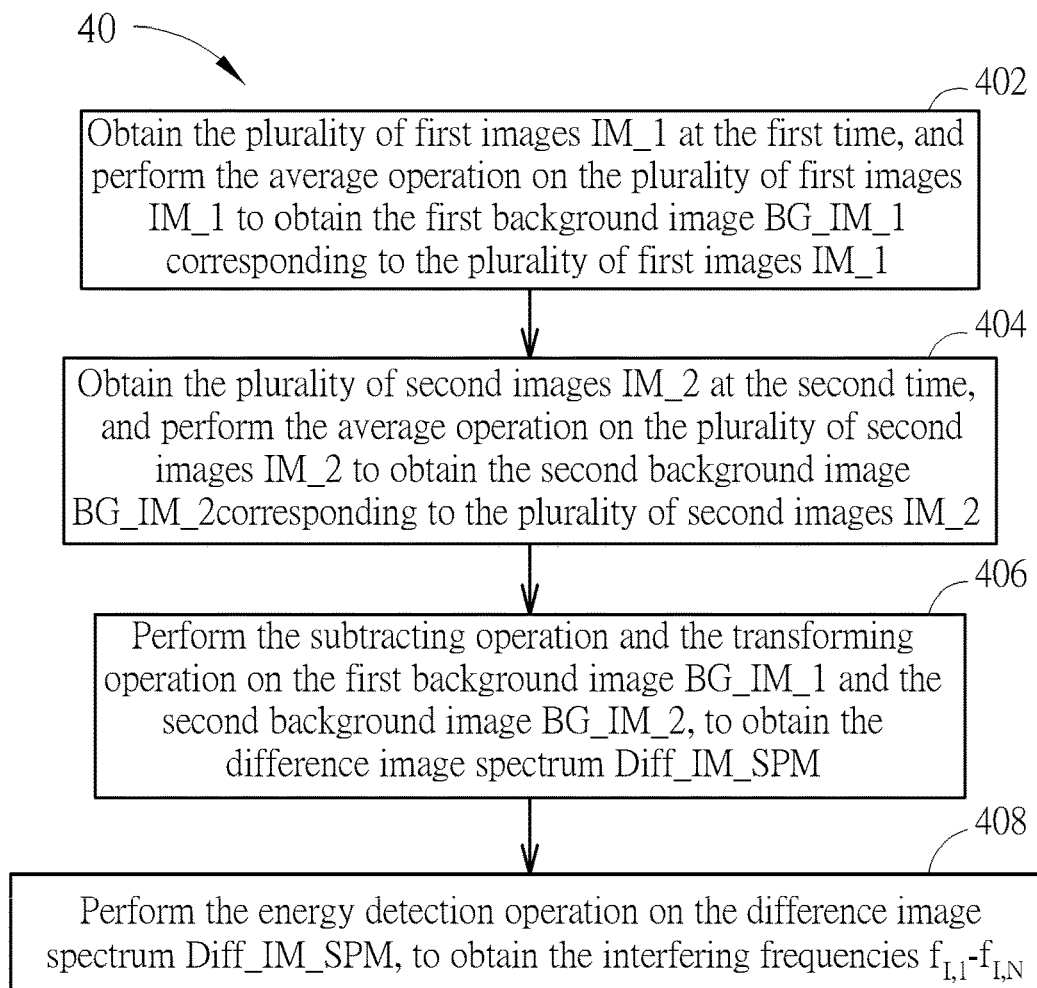
FIG. 4 is a schematic diagram of a process according to an embodiment of the present application.

Operations of the computing module 14 obtaining the background image BG_IM and the interfering frequencies $f_{I,1}$-$f_{I,N}$ may be summarized as a process 40, as shown in FIG. 4. The process 40 comprises the following steps:

Step 402: Obtain the plurality of first images IM_1 at the first time, and perform the average operation on the plurality of first images IM_1 to obtain the first background image BG_IM_1 corresponding to the plurality of first images IM_1.

Step 404: Obtain the plurality of second images IM_2 at the second time, and perform the average operation on the plurality of second images IM_2 to obtain the second background image BG_IM_2 corresponding to the plurality of second images IM_2.

Step 406: Perform the subtracting operation and the transforming operation on the first background image BG_IM_1 and the second background image BG_IM_2, to obtain the difference image spectrum Diff_IM_SPM.

Step 408: Perform the energy detection operation on the difference image spectrum Diff_IM_SPM, to obtain the interfering frequencies $f_{I,1}$-$f_{I,N}$.

Notably, Step 302 and the process 40 are executed under a condition that the display panel 11 is not pressed by the finger FG of the user. That is, execution of Step 302 and the process 40 should be completed before the fingerprint identification is performed, to obtain the background image BG_IM and the interfering frequencies $f_{I,1}$-$f_{I,N}$ in advance. In other words, Step 302 and the process 40 belong to the steps of an offline stage. When the display panel 11 is pressed by the finger FG of the user to perform the fingerprint identification, in Step 304, the light emitting unit 18 emits the incident light and the image sensing array SN_array receives the received image RCV_IM.

After the image sensing array SN_array receives the received image RCV_IM, in Step 306, the computing module 14 performs the subtracting operation on the received image RCV_IM and the background image BG_IM, to obtain the difference image. The background image BG_IM may be the first background image BG_IM_1 or the second background image BG_IM_2. The computing module 14 may subtract the background image BG_IM from the received image RCV_IM, or subtract the received image RCV_IM from the background image BG_IM, which are within the scope of the present application. In Step 308, the computing module 14 performs the filtering operation on the difference image Diff_IM at the interfering frequencies $f_{I,1}$-$f_{I,N}$, which is to perform the filtering operation on the difference image Diff_IM especially on the interfering frequencies $f_{I,1}$-$f_{I,N}$, to filter out the interference components, so as to obtain the operational result OUT.

Figure 5:
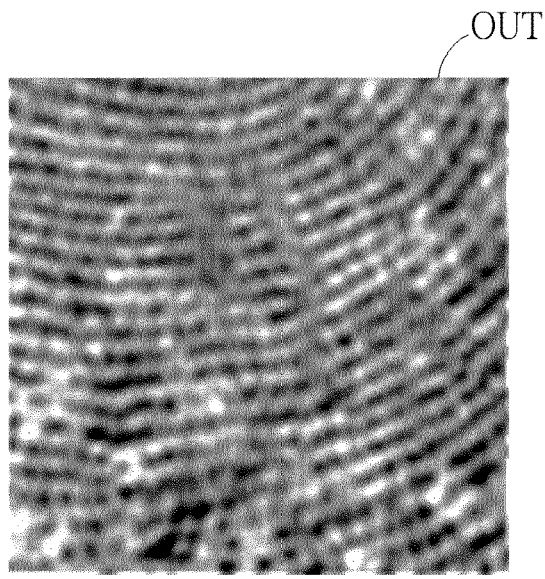
FIG. 5 is a schematic diagram of an operational result according to an embodiment of the present application.

After the computing module 14 completes the execution of the fingerprint image processing process 30, the computing module 14 may output the operational result OUT to the identification module 16, and the fingerprint of the finger FG is determined according to the operational result OUT. Please refer to FIG. 5, which is a schematic diagram of the operational result OUT. As can be seen from FIG. 2 and FIG. 5, the fingerprint image is more obvious in the operational result OUT FIG. 5 (compared to the received image RCV_IM of FIG. 2), such that the identification module 16 determines the fingerprint of the finger FG more accurately.

As can be seen from the above, the present application obtains the background image BG_IM and the interfering frequencies $f_{I,1}$-$f_{I,N}$ in the offline stage. When the optical fingerprint identification system 12 enters the fingerprint identification stage (i.e., on the flight), the computing module 14 may subtract the background image BG_IM from the received image RCV_IM to eliminate the lattice interference, and perform the filtering operation at the interfering frequencies $f_{I,1}$-$f_{I,N}$ to filter out the interference components, so as to obtain the operational result OUT with clearer fingerprint image, such that the identification module 16 may determine the fingerprint of the finger FG accurately.

In summary, the present application is suitable for in-display fingerprint identification, which utilizes subtracting the background image to eliminate the lattice interference, and utilizes filtering at the interfering frequencies to filter out the interference components to filter out the interference components, to obtain the image with clearer fingerprint image, so as to enhance the accuracy of fingerprint identification.

The foregoing is only embodiments of the present application, which is not intended to limit the present application. Any modification following the spirit and principle of the present application, equivalent substitutions, improvements should be included within the scope of the present application.

What is claimed is:

1. A fingerprint image processing method, applied in an optical fingerprint identification system of an electronic device, wherein the electronic device comprises a display panel, the display panel comprises a display pixel array, the optical fingerprint identification system comprises an image sensing array, the image sensing array is disposed under the display pixel array, characterized in that, the fingerprint image processing method comprises:
   obtaining a background image and obtaining at least an interfering frequency when the display panel is not pressed by a finger of a user, wherein no fingerprint image is included in the background image, and the at least an interfering frequency is related to interference due to different expansion coefficients of the display pixel array and the image sensing array;
   receiving a received image when the display panel is pressed by the finger of the user;
   performing a subtracting operation on the received image and the background image, to obtain a difference image; and
   performing a filtering operation on the difference image at the at least an interfering frequency to filter out the interference, to obtain an operational result;
   wherein the optical fingerprint identification system determines a fingerprint within the received image according to the operational result.

2. The fingerprint image processing method of claim 1, characterized in that, the step of obtaining the background image comprises:
   obtaining a plurality of first images, wherein no fingerprint image is included in the plurality of first images; and
   performing an average operation on the plurality of first images, to obtain a first background image corresponding to the plurality of first images.

3. The fingerprint image processing method of claim 2, characterized in that, the step of obtaining the at least an interfering frequency comprises:
   obtaining a second background image, wherein no fingerprint image is included in the second background image;
   performing a subtracting operation and a transforming operation on the first background image and the second background image, to obtain a difference image spectrum; and
   performing an energy detection operation on the difference image spectrum, to obtain the at least an interfering frequency.

4. The fingerprint image processing method of claim 3, characterized in that, the step of obtaining the at least an interfering frequency comprises:
   obtaining a plurality of second images, wherein no fingerprint image is included in the plurality of second images; and
   performing an average operation on the plurality of second images, to obtain the second background image.

5. An optical fingerprint identification system, applied in an electronic device, wherein the electronic device comprises a display panel, the display panel comprises a display pixel array, characterized in that, the optical fingerprint identification system comprises:
   an image sensing array, disposed under the display pixel array, configured to receive a received image when the display panel is pressed by a finger of a user;
   a computing module, coupled to the image sensing array, configured to execute following steps:
      obtaining a background image and obtaining at least an interfering frequency when the display panel is not pressed by the finger of the user, wherein no fingerprint image is included in the background image, and the at least an interfering frequency is related to interference due to different expansion coefficients of the display pixel array and the image sensing array;
      performing a subtracting operation on the received image and the background image, to obtain a difference image; and
      performing a filtering operation on the difference image at the at least an interfering frequency to filter out the interference, to obtain an operational result; and
   an identification module, coupled to the computing module comprising, configured to determine a fingerprint within the received image according to the operational result.

6. The optical fingerprint identification system of claim 5, characterized in that, the computing module is further configured to execute following steps to obtain the background image:

obtaining a plurality of first images, wherein no fingerprint image is included in the plurality of first images; and performing an average operation on the plurality of first images, to obtain a first background image corresponding to the plurality of first images.

7. The optical fingerprint identification system of claim 6, characterized in that, the computing module is further configured to execute following steps to obtain the at least an interfering frequency:

obtaining a second background image, wherein no fingerprint image is included in the second background image;

performing a subtracting operation and a transforming operation on the first background image and the second background image, to obtain a difference image spectrum; and performing an energy detection operation on the difference image spectrum, to obtain the at least an interfering frequency.

8. The optical fingerprint identification system of claim 7, characterized in that, the computing module is further configured to execute following steps to obtain the at least an interfering frequency:

obtaining a plurality of second images, wherein no fingerprint image is included in the plurality of second images; and performing an average operation on the plurality of second images, to obtain the second background image.

9. An electronic device, characterized by, comprising:
a display panel, comprising a display pixel array; and
an optical fingerprint identification system, comprising:
an image sensing array, disposed under the display pixel array, configured to receive a received image when the display panel is pressed by a finger of a user;
a computing module, coupled to the image sensing array, configured to execute following steps:
obtaining a background image and obtaining at least an interfering frequency when the display panel is not pressed by the finger of the user, wherein no fingerprint image is included in the background image, and the at least an interfering frequency is related to interference due to different expansion coefficients of the display pixel array and the image sensing array;

performing a subtracting operation on the received image and the background image, to obtain a difference image; and performing a filtering operation on the difference image at the at least an interfering frequency to filter out the interference, to obtain an operational result; and an identification module, coupled to the computing module, configured to determine a fingerprint within the received image according to the operational result.

10. The electronic device of claim 9, characterized in that, the computing module is further configured to execute following steps to obtain the background image:

obtaining a plurality of first images, wherein no fingerprint image is included in the plurality of first images; and performing an average operation on the plurality of first images, to obtain a first background image corresponding to the plurality of first images.

11. The electronic device of claim 10, characterized in that, the computing module is further configured to execute following steps to obtain the at least an interfering frequency:

obtaining a second background image, wherein no fingerprint image is included in the second background image;

performing a subtracting operation and a transforming operation on the first background image and the second background image, to obtain a difference image spectrum; and performing an energy detection operation on the difference image spectrum, to obtain the at least an interfering frequency.

12. The electronic device of claim 11, characterized in that, the computing module is further configured to execute following steps to obtain the at least an interfering frequency:

obtaining a plurality of second images, wherein no fingerprint image is included in the plurality of second images; and performing an average operation on the plurality of second images, to obtain the second background image.

* * * * *